Patented Feb. 26, 1952

2,587,411

UNITED STATES PATENT OFFICE

2,587,411

ACYCLIC OLEFINIC ACID CONDENSATION PRODUCT OF POLYHYDRIC ALCOHOL COMPOUND

Harry M. Ullmann, deceased, late of Bethlehem, Pa., by Rachel M. Ullmann, executrix, Bethlehem, Pa., and Judson G. Smull, Bethlehem, Pa., and Edward Artim, Yancey Mills, Va.; said Artim assignor of one-sixth to said Rachel M. Ullmann, executrix, and one-sixth to said Judson G. Smull No Drawing. Application April 27, 1949, Serial No. 90,048

10 Claims. (Cl. 260—404.8)

The present invention relates to the production of condensation products of the character produced by the Clocker reaction.

A purpose of the invention is to make possible the production of a wide variety of Clocker reaction products of fatty acids notwithstanding the presence of a secondary alcohol group.

A further purpose is to promote or catalyze the Clocker reaction by the presence of a secondary alcohol group in a polyhydric alcohol.

A further purpose is to facilitate the conversion of nonconjugated unsaturated fatty oils into Clocker condensation products having an available secondary alcohol group, and influenced as to their properties by that secondary alcohol group.

A further purpose is to produce Clocker reaction products of di-glycerides of nonconjugated unsaturated fatty oils.

Further purposes appear in the specification and in the claims.

In the prior art, acyclic olefinic acids and their anhydrides such as maleic anhydride have been successfully reacted with conjugated unsaturated fatty acids and their oils under varying conditions according to the diene synthesis of Diels-Alder. The mechanism of this reaction involves a 1,4 addition of the maleic anhydride to the conjugated diene.

It has been shown by Edwin E. Clocker that nonconjugated unsaturated nonhydroxylated fatty acids and their oils can be combined with maleic anhydrides and the like under different conditions and to produce different compounds. See Clocker Patents 2,188,882 to 2,188,890, 2,262,923, 2,275,843, 2,286,646, and 2,286,466, incorporated herein by reference and made a part hereof. According to the accepted mechanism of the Clocker reaction, the maleic anhydride or the like combines at the carbon chain of the fatty acid or fatty oil. It is considered that the reaction takes place at an active methylene carbon atom of the unsaturated fatty acid carbon chain, whereby a shift of a hydrogen atom from that carbon chain to an olefinic carbon atom of the maleic anhydride occurs, thereby forming a substitute succinic anhydride derivative with no loss in the double bonds involved. The attachment of the maleic anhydride or the like to the carbon chain of the fatty acid therefore occurs at this methylene carbon atom which was vacated by the hydrogen atom.

A. Schwarcman in U. S. Patent 2,412,177 reacts fatty oil with glycerine to form the di-glyceride, and then reacts the di-glyceride at elevated temperature (above 271° C.) with maleic anhydride. This is said to cause the formation of an ester.

In the prior art it has not generally been possible to obtain the Clocker reaction where a hydroxyl group is present, due to the tendency to esterify at the hydroxyl group. Thus the possibility of modifying the properties of the Clocker reaction product by the presence of an alcohol group has not existed in most cases.

We have discovered that the Clocker reaction can be carried out in the presence of a secondary alcohol group of a polyhydric alcohol with satisfactory results provided that available primary alcohol groups in the particular molecule have been esterified previously. Available primary alcohol groups may exist in the reaction mixture in some other compound, but they must not be present in the particular molecule which is undergoing the Clocker reaction.

By this procedure it is possible to introduce the tendency to alcohol solubility, or any other special advantageous properties characteristic of the presence of an alcohol group, without the difficulty due to esterification and without destroying the secondary alcohol group by esterification.

The invention appears to depend upon the encouragement or catalysis of the Clocker reaction by the secondary alcohol group when available primary alcohol groups are no longer present in the molecule.

In order to produce the condensation product of the invention, a substituted aliphatic polyhydric alcohol including at least one secondary alcohol group is employed. Any one of the polyhydric alcohols having secondary alcohol groups may be used, typical examples being glycerol, nonsymmetrical glycols such as propylene glycol, butylene glycol, pentylene glycol, 2 methyl pentanediol 1,3, any pentitol, such as xylitol, and any hexitol such as mannitol and sorbitol. The number of carbon atoms in the aliphatic carbon chain may vary from three to ten, preferably from three to eight. The carbon chain will preferably be straight, but may be branched.

These aliphatic polyhydric alcohols all have the common characteristic of having a plurality of hydroxyl groups, one or more of which is a secondary alcohol group —CHOH, and one or more of which is a primary alcohol group, —$CH_2OH$. The disclosure is generic and intended to include any polyhydric alcohol, having a secondary alcohol group. Although the polyhydric alcohols are generally considered as aliphatic compounds, they may in some cases be cyclic, as in 1,4 anhydromannitol, 1,5 anhydromannitol, 1,4 anhydrosorbitol and 1,5 anhydrosorbitol. For the purpose of the present invention, an anhydride alcohol group which may result from a primary alcohol group and a secondary alcohol group not adjacent thereto may be disregarded, since such group is not readily available for esterification.

A polyhydric alcohol of the character described is esterified to cause fatty acid molecules to combine with all available primary alcohol groups, prior to the reaction with the acyclic olefinic acid. The fatty acid employed in the esterification may be any nonconjugated unsaturated aliphatic acid having from ten to twenty-four carbon atoms in its carbon chain, as set forth in detail in the Clocker patents above referred to, typical examples being oleic, linoleic, linolenic, clupanodonic and undecylenic. These may be obtained from suitable fatty oils, of which numerous examples are mentioned in the Clocker patents, such as soya bean, linseed, perilla, cotton seed, corn, sunflower, safflower, pumpkin seed, peanut, castor and the like.

For some purposes it is desirable to avoid hydroxylated oils, especially oils having a primary alcohol group, as they will esterify. However, it has been found that the presence of a secondary alcohol group on the carbon chain of the oil, as in ricinoleic acid or castor oil is not objectionable, as the secondary alcohol group does not esterify under the conditions of the subsequent reaction with acyclic olefinic acid as discovered by Ullmann. In cases where esterification is not objectionable, a primary alcohol group may be present in the oil, due allowance being made for the esterification in calculating the quantity of acyclic olefinic acid to be used.

For many purposes the ester of the polyhydric alcohol may be obtained by glycerolysis or other polyhydric alcoholysis of the oil, as by heating the fatty oil at elevated temperatures in the presence of glycerine or other polyhydric alcohol at temperatures above 200° C. for times ordinarily in excess of 30 minutes. By proper calculation of the quantity of polyhydric alcohol added, it is possible to obtain a di-glyceride of the fatty acid, or other suitable compound of the polyhydric alcohol having all available primary alcohol groups esterified and at least one available secondary alcohol group present.

Where the primary alcohol groups are to react with fatty acid to esterify them, at the same time preventing esterification of the secondary alcohol group or groups, the polyhydric alcohol and the fatty acid should be reacted at a temperature of between 100 and 150° C. for a time of at least 30 minutes. To avoid complication with the Clocker reaction, the esterification of the primary alcohol groups will be carried on prior to the Clocker reaction and as a separate step wherever possible. It will be understood that any accepted technique to obtain a di-glyceride or non-symmetrical glycol mono-ester or similar compound may be used.

The acyclic olefinic acid may be an acid or acid anhydride having less than ten carbon atoms in the carbon chain, numerous examples appearing in the Clocker patents above referred to. Suitable acids are maleic, and the acids which yield maleic, such as fumaric. Substituted maleic acids may also be used, such as citraconic, itaconic, aconitic, dimethylmaleic and diethylmaleic acid or the acid anhydride of these.

The reaction of the invention can be carried out notwithstanding the presence of other ingredients which may not participate in the reaction, but may undergo some other reaction. For example, the Clocker reaction with the di-glyceride can be carried out notwithstanding the presence of monoglyceride which is esterified with the acyclic olefinic acid at the same time that the di-glyceride under the conditions undergoes the Clocker reaction.

We have discovered that in order to cause the Clocker reaction to occur in an esterified polyhydric alcohol in the presence of an unesterified secondary alcohol group, it is necessary to employ a reaction temperature in excess of 100° C. and below 150° C. The reaction time should be in excess of 15 minutes and for best results the reaction is carried on for a time in the range from ½ hour to 4 hours. Longer times of reaction may be used.

*Example I*

Three hundred parts by weight of soya bean oil having an iodine number of 135, an acid value of .02 and a negligible acetyl value, was reacted with 11.1 parts by weight of glycerine (3.7 percent on the weight of the oil) in the presence of 0.09 part by weight of litharge to act as a catalyst. The reaction was carried on for 45 minutes at a temperature of 227° C. Two-thirds of the oil was converted to di-glyceride, having a secondary alcohol group.

Seventy-four parts by weight of the reaction mixture was heated with 5.14 parts by weight of maleic anhydride (7.2 percent on the weight of the glycerides) at 125° C. for 30 minutes. The resulting solution was clear and free from cloudiness or precipitation on cooling.

The resultant product had an iodine number of 125, and an acetyl value of 52.5.

With due allowance for the effect of the added ingredients the iodine number of the reaction product corresponds to the theoretical iodine number which would be expected if no double bonds had been saturated, within the limit of experimental error, thus clearly indicating that a Clocker type reaction has occurred.

The acetyl value corresponds to a Clocker reaction of two-thirds di-glyceride and one-third tri-glyceride.

On repetition of Example I at higher temperatures, as the temperature of reaction increased above 150° C. the acetyl value dropped rapidly, indicating that esterification of the secondary alcohol group takes precedence over the Clocker reaction in competing for maleic anhydride at the higher temperature. This is not true, however, in the temperature range above 100° C. and below 150° C., in which range the Clocker reaction takes precedence notwithstanding the presence of the secondary alcohol group. This is believed to indicate that the secondary alcohol group is not only difficult to esterify, but also that presence of the secondary alcohol group catalyzes the Clocker reaction, since it has been found the Clocker reaction is possible in the presence of the secondary alcohol group at a lower temperature than it will occur in the fatty oil in the absence of a secondary alcohol group.

The product is much more rapid drying than the original soya bean oil, and is comparable to a drying oil rather than a semi-drying oil.

*Example II*

Instead of maleic anhydride, citraconic anhydride is employed in the same molecular proportions. The product is comparable to that of Example I in all respects.

*Example III*

Instead of soya bean oil, linseed oil is employed, using the same molecular proportions. The resulting product is more rapidly drying than the product of Example I and more rapidly drying than the original linseed oil.

*Example IV*

First 280 parts by weight of the mixed fatty acids of linseed oil are reacted with 76 parts by weight of propylene glycol, $CH_2OHCHOHCH_3$, at 150° C. in excess of 30 minutes to form the primary alcohol mono-ester of propylene glycol with oleic, linoleic and linolenic acids. The reaction product is then heated at 130° C. with five percent on the weight of the propylene glycol mono-ester of maleic anhydride. The product is less viscous than that of Example I, but otherwise similar.

*Example V*

280 parts by weight of the mixed fatty acids of linseed oil are heated with 180 parts by weight of two methyl pentanediol 1,3 at 150° C. for one hour. The reaction product is then heated at 110° C. with three percent on the weight of the ester of citraconic anhydride. On further thermal treatment the product gives a thermoplastic resin.

Example V by weight of a mixture of ninety-five percent di-glyceride of linoleic acid and five percent monoglyceride of linolenic acid is heated with fifteen percent on the weight of the oil of maleic anhydride at 145° C. for two hours. The product is a composite of a primary alcohol ester of maleic acid which forms preferentially on the mono-ester, and a Clocker product forming with the di-glyceride and the diester of linolenic acid once it has formed. It is thus possible to produce the product of the present invention in the presence of available primary alcohol groups as long as there is an excess of acid beyond that which combines with the primary alcohol groups.

It has been found that for proper results the range of the acyclic olefinic acid may vary between one percent and fifteen percent on the weight of the ester of polyhydric alcohol. The higher percentage produces materials of increased viscosity or tendency for viscosity increase, and the lower percentage produces materials of less pronounced viscosity change.

It will be evident that all of the materials of the invention are capable of undergoing reaction at the acid or acid anhydride group, as clearly set forth in the Clocker patents, to obtain esters, salts, partial esters, partial salts, salt-esters, and the like, which are useful as explained in the Clocker patents for dispersing agents, bodying agents, modifying agents, resinous compositions, softeners, plasticizers, wetting additives for coating vehicles, for obtaining improved adherence of vehicles to base materials and for other purposes, as well known and explained in the Clocker patents.

In addition the tendency for compatability with materials having alcohol soluble characteristics is greatly increased by virtue of the secondary alcohol group present in the present invention, as compared with the products of the Clocker patents.

In view of our invention and disclosure variations and modifications to meet individual whim or particular need will doubtless become evident to others skilled in the art to obtain all or part of the benefits of our invention without copying the process shown, and we, therefore, claim all such insofar as they fall within the reasonable spirit and scope of our claims.

Having thus described our invention what we claim as new and desire to secure by Letters Patent is:

1. The process of forming a condensation product, which comprises reacting together (1) a polyhydric alcohol having a free secondary alcohol group and having a primary alcohol group combined with a nonconjugated unsaturated aliphatic acid having from ten to twenty-four carbon atoms in its carbon chain, and having all primary alcohol groups esterified, with from one to fifteen percent on the weight of the polyhydric alcohol ester of (2) an acyclic olefinic acid having less than ten carbon atoms in its carbon chain at a temperature above 100 and below 150° C. for a time of at least 15 minutes, while maintaining the acyclic olefinic acid free from esterification in said reaction.

2. The process of forming a condensation product, which comprises reacting together (1) a polyhydric alcohol having a free secondary alcohol group and having all primary alcohol groups combined with a nonconjugated unsaturated aliphatic acid having from ten to twenty-four carbon atoms in its carbon chain, with from one to fifteen percent on the weight of the polyhydric alcohol ester of (2) an acyclic olefinic acid having less than ten carbon atoms in its carbon chain at a temperature above 100 and below 150° C. for a time of at least 15 minutes, while maintaining the acyclic olefinic acid free from esterification in said reaction.

3. The process of producing a condensation product, which comprises reacting (1) a polyhydric alcohol having primary and secondary alcohol groups with (2) a nonconjugated unsaturated aliphatic acid having from ten to twenty-four carbon atoms in its carbon chain until primary alcohol groups have esterified with the aliphatic acid and a compound having only free secondary alcohol groups remains at a temperature of between 100 and 150° C. for a time of at least 30 minutes and then (3) combining the reaction mixture with an acyclic olefinic acid having less than ten carbon atoms in its carbon chain at a temperature above 100° C. and below 150° C. for a time of at least 15 minutes, while maintaining the acyclic olefinic acid free from esterification in said reaction.

4. The process of forming a condensation product from a nonconjugated unsaturated fatty oil, which comprises reacting the oil with glycerine to form di-glyceride having a free secondary alcohol group and reacting the di-glyceride with an acyclic olefinic acid having less than ten carbon atoms in its carbon chain at a temperature above 100° and below 150° C. for a time of at least 15 minutes, while maintaining the acyclic olefinic acid free from esterification in said reaction.

5. The process of forming a condensation product, which comprises reacting a nonconjugated unsaturated fatty oil with glycerine to form the di-glyceride having a free secondary alcohol group, and reacting the di-glyceride with maleic anhydride at a temperature in excess of 100 and below 150° C. for at least 15 minutes, while maintaining the maleic anhydride free from esterification in said reaction.

6. The process of producing a condensation product, which comprises reacting propylene glycol having the primary alcohol group esterified by the fatty acid of a nonconjugated unsaturated fatty acid having from ten to twenty-four carbon atoms in its carbon chain and having a free secondary alcohol group, with an acyclic olefinic acid having less than ten carbon atoms in its carbon chain, at a temperature in excess of 100° C. and below 150° C. for a time of at least 15 minutes, while maintaining the acyclic olefinic acid free from esterification in said reaction.

7. A condensation product comprising a polyhydric alcohol having a free secondary alcohol group and having the primary alcohol group esterified by nonconjugated unsaturated aliphatic acid having from ten to twenty-four carbon atoms in its carbon chain and having combined at the carbon chain of the aliphatic acid an acyclic olefinic acid having less than ten carbon atoms in its carbon chain.

8. A condensation product comprising a polyhydric alcohol having a free secondary alcohol group and having all primary alcohol groups esterified by nonconjugated unsaturated aliphatic acid having from ten to twenty-four carbon atoms in its carbon chain and having combined at the carbon chain of the aliphatic acid an acyclic olefinic acid having less than ten carbon atoms in its carbon chain.

9. A di-glyceride of a nonconjugated unsaturated fatty oil having a free secondary alcohol group as the only free alcohol group present and having an acyclic olefinic acid having less than ten carbon atoms in its carbon chain combined to the carbon chain of the fatty oil.

10. A di-glyceride of a nonconjugated unsaturated fatty oil having a free secondary alcohol group as the only free alcohol group present and having maleic anhydrides combined to the carbon chain of the fatty acid of the oil.

RACHEL M. ULLMANN,
*Executrix for the Estate of Harry M. Ullmann, Deceased.*
JUDSON G. SMULL.
EDWARD ARTIM.

REFERENCES CITED

The following references are of record in the file of this patent:

FOREIGN PATENTS

| Number | Country | Date |
|--------|---------|------|
| 565,431 | Great Britain | Nov. 10, 1944 |
| 565,432 | Great Britain | Nov. 10, 1944 |